2 Sheets—Sheet 1.

G. H. ENNIS.
Machine for Preparing Paper-Pulp.

No. 225,976. Patented Mar. 30, 1880.

WITNESSES
INVENTOR

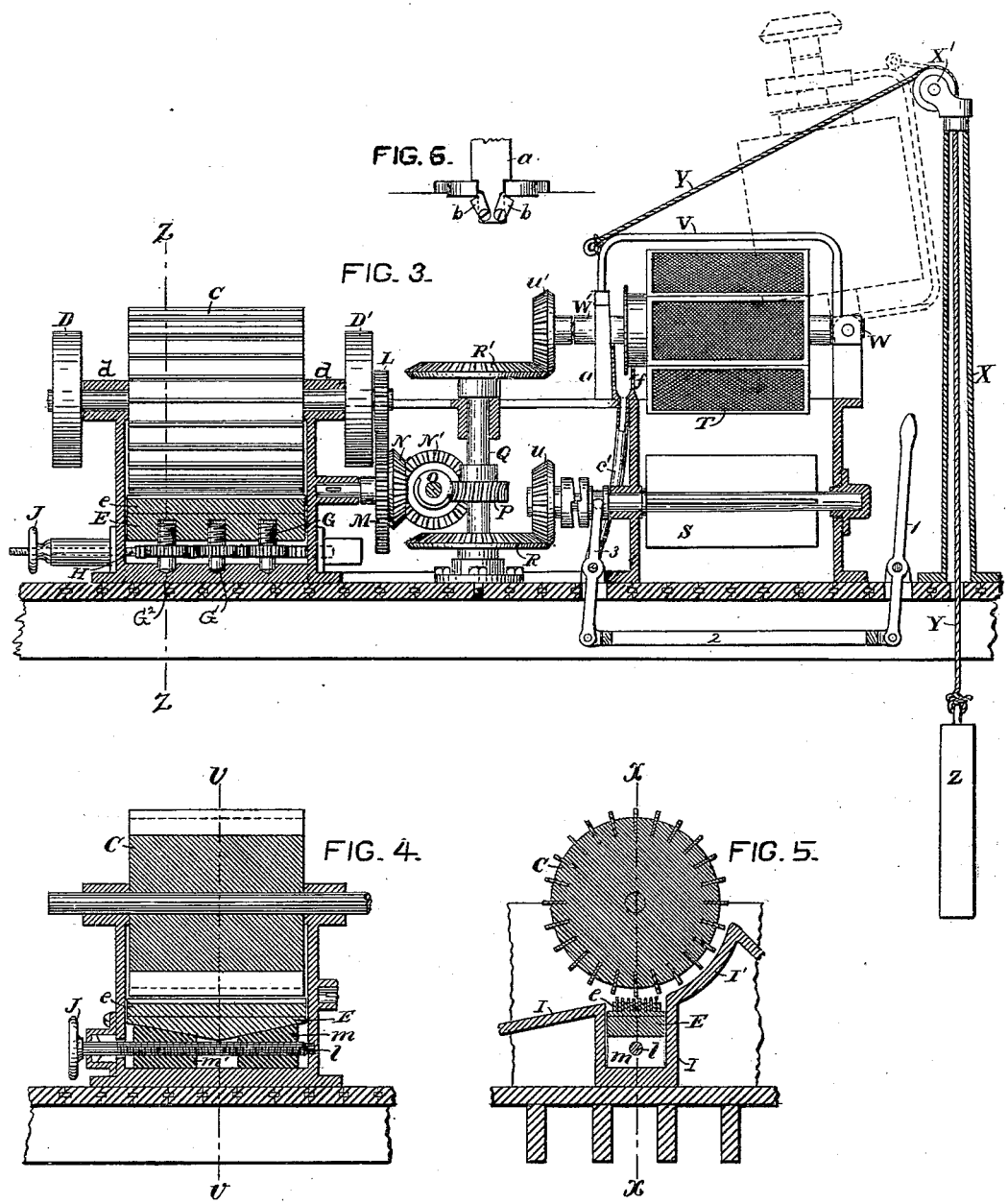

UNITED STATES PATENT OFFICE.

GEORGE H. ENNIS, OF TROY, NEW YORK.

MACHINE FOR PREPARING PAPER-PULP.

SPECIFICATION forming part of Letters Patent No. 225,976, dated March 30, 1880.

Application filed October 9, 1879.

*To all whom it may concern:*

Be it known that I, GEORGE H. ENNIS, of the city of Troy, State of New York, have invented a certain new and useful Machine for Preparing Paper-Pulp, of which the following specification, in connection with the accompanying drawings, embraces a full and clear description.

Figure 1:
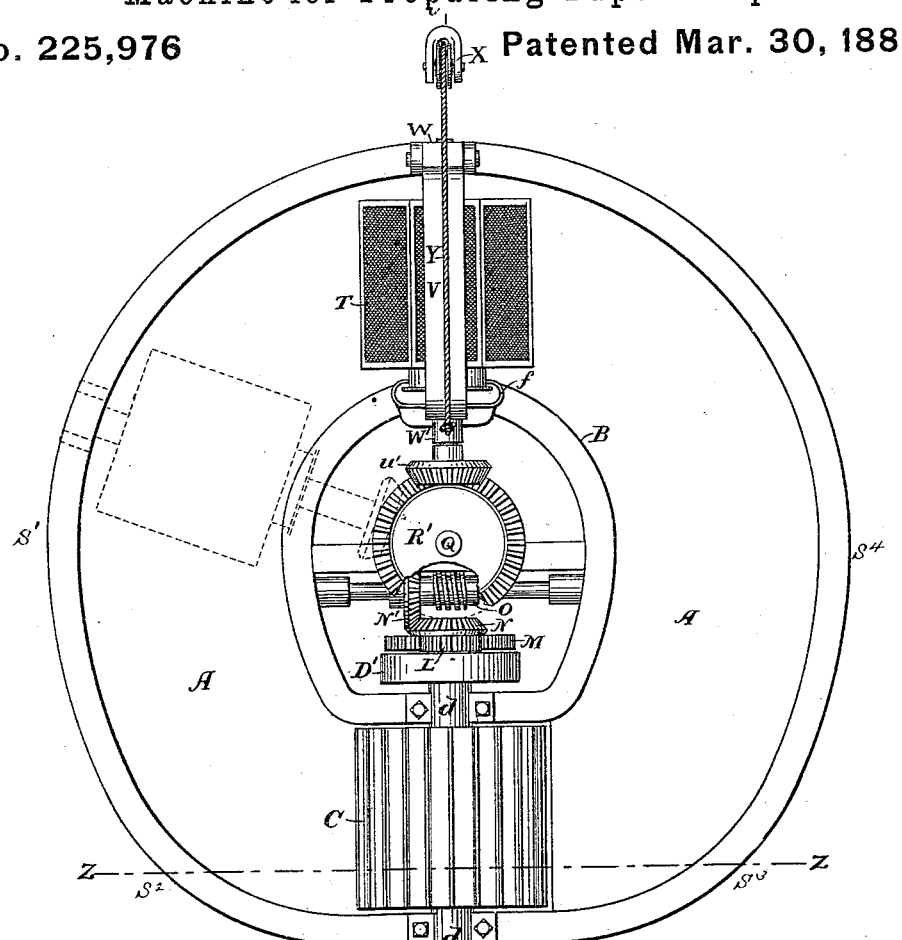
Figure 2:
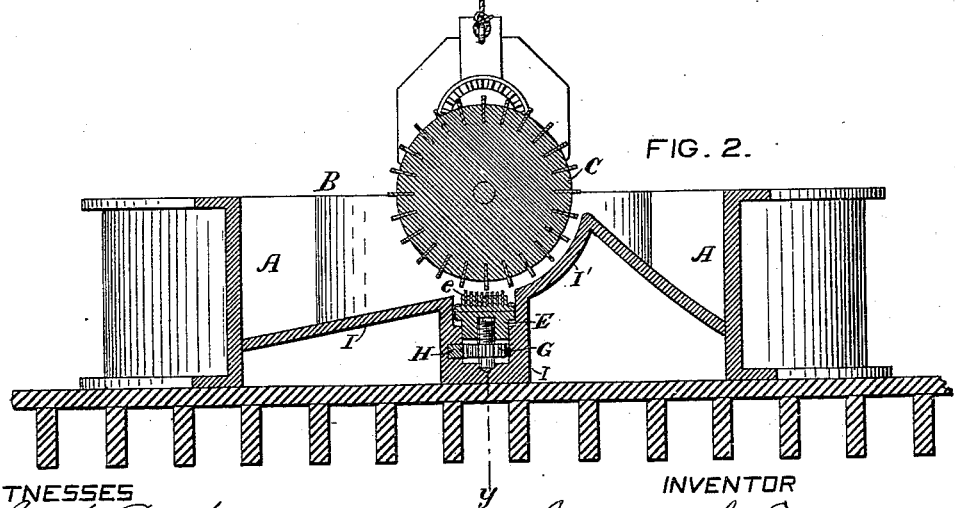

Figure 1 is a plan view of my machine. Fig. 2 is a vertical section of one end of the same through the line $z\ z$. Fig. 3 is a longitudinal section of the same.

Like letters of reference refer to like parts in the several views.

A A, Fig. 1, is a tub or vat having one end or side straight or rectangular, while the remainder of its shape is as nearly circular in form as the termination of its curved sides in the rectangular side, avoiding rigidity of curve, will permit; or, more specifically, it consists of a semicircle and of easy curves extending from the semicircle and terminating in the straight or rectangular side, and approximating in whole somewhat to a horseshoe shape, as $s'\ s^2\ s^3\ s^4$, Fig. 1.

In the vat A A (having suitable back and front falls, as shown in Fig. 2) is the hollow vessel or vat B, Figs. 1 and 2, nearly conforming in its shape to the form of the exterior inclosing-vat A, the office of which is hereinafter explained.

At the rectangular end of the vat A A is placed the engine-roll C, of any suitable form of construction, the axis or shaft of which rests in suitable bearings $d\ d$, secured to the upper sides of the vats A A and B, as shown in Figs. 1 and 3.

Beneath the roll C is the bed-plate $e$, Figs. 2 and 3, of any suitable form of construction, inclosed in a "shoe." The latter passes through a suitable opening in the front fall, and is secured firmly, by bolts or otherwise, to the movable bed-piece E, Figs. 2 and 3.

The bed-piece E is fitted into the bed-frame I, so as to be held securely in position when elevated or depressed, by means of the male screw-threads $i\ i\ i$ on the axes or shafts of the spur-gears G G' G², working into corresponding female screw-threads cut in the sides or walls of openings in the under side of the bed-piece E. The axes of the spur-gears G G' G² rest in suitable seats in the bed-frame I. The rack H gears into the spur-gears G G' G², and has cut on its outer end a screw-thread, which is driven by a screw cut in the center of the hand-wheel J, acting as a nut.

It will be seen that by the action of the hand-wheel J, Fig. 3, the rack H will give a perfect and independent motion to each of the spur-gears G G' G², which, in their turn, by the action of the screws on the fixed nut or bed-piece E, will elevate or depress the latter, with its attached and supported shoe, and adjust the distance of the bed-plate to the roll, as may be required, insuring in this manner an even and uniform wear of both the bed-plate and roll and an economical return of the power used in driving the roll C. The number of spur-gears with threads on them, &c., will depend on the size and weight of bed-piece and its supported and attached bed-plate to be moved or variably adjusted to the roll.

The above important considerations will be the more fully understood when it is stated that in the ordinary form of paper-engine the roll shaft or spindle is stationary at the driving end, while the other end rests on a lever or "lighter-bar," by whose elevation or depression the roll is caused to approach or recede from the bed-plate, as required in the various stages of preparing the pulp. The free end of the roll-spindle describes in its elevation or depression an arc of a circle, causing the roll to rest unevenly on the bed-plate. To remedy this defect resort is commonly had to adjustable swinging bearings or swivel-boxes. The extended use of the paper-engine as thus arranged has shown that the evil above referred to is but partially remedied by this arrangement, and that the bed-plate is always worn down more on the outside than on the inner or mid-fellow side.

The following extract from Carl Hoffman's "Manufacture of Paper" will more fully present a large experience on this subject:

"Whenever the shaft is raised or lowered by the lighter it occupies a more or less inclined position, or, to speak correctly, makes a different angle with the horizontal line. If the two bearings or shells do not follow these motions, the shaft will only lie in them in one position, while in all the others it will rest on a corner of the box only. Instead of being immovable, the bearings should turn on pivots, which permit of their changing positions with the journals. It is evident that the rags can only be treated alike by the roll so long as the distance between the revolving and stationary knives is everywhere the same. When the lighter is raised or lowered, it is done with the intention of increasing or reducing that distance to a certain opening. But how can this be obtained if the two sets of knives are not parallel and the bed-plates are so set that they are not touched all across by the fly-bars when in contact with them? But this position is seldom allowed while working. The lighter-bar is always more or less raised, the shaft and fly-bars forming an angle with the bed-knives. If the length of the roll is about one-third of that of the shaft between the two bearings, and the front corners of the fly-bars are raised to about three-eighths of an inch above the plates, the back corner can only be two-eighths or one-fourth inch off; or there is always one-third difference between the openings at the two ends. An engineer would laugh if he was told it did not make any difference if the fly-bars were raised one quarter or three-eighths inch; and the plates on being removed are always worn most near the outside of the tub. If they are, for example, reduced three-eighths inch at the front side, they will only be one-quarter inch below their original height at the back end. As the plates can be worn down by the friction of the rags only, we are forced to the conclusion that the rags have been subjected to the severest action where most of the steel has disappeared—that is, on the front side; yet we allow the same pulp to be subjected to such a different treatment at all times in our engines. As the plates are wearing down, the roll follows them, and its shaft being stationary at the back end, it will descend lower at the front side than near the mid-fellow. Every paper-maker knows that."

The roll-shaft C may be driven by a pulley or gears at the front side, or by a pulley or gears in the hollow space or receptacle B, or at both ends of roll-shaft, if required, as shown in Figs. 1 and 3.

The inner end of the roll-shaft has on it a spur-gear, L, Figs. 1 and 3, gearing into the spur-gear M, Fig. 3. This latter gear, supported in a stud, has on its shaft a miter-gear, N, gearing into its companion miter-gear N' on a shaft suitably supported. The screw or worm o on the shaft of the latter drives the worm-gear P on the upright shaft Q. In this manner the upright shaft Q receives a relatively slow motion in the proper direction and adaptable to the uses hereinafter described. The speed of this shaft Q is regulated by the relative diameters of the spur-gears L M, as well as the diameter of the worm-gear P.

The upright shaft Q rests upon a step at its lower end, and is held in place at its upper end by passing through a suitable bar or support secured to the sides of the vat B. The large bevel-gears R R' upon this shaft respectively give motion to the agitator or stock-impeller S at its lower end and the washer T at its upper end.

The duty of the agitator S is various: to drive the "stuff" with greater rapidity than now under the roll, thus relieving the roll, in part, of the necessity of turning the stuff and confining the roll more particularly to its legitimate duty of grinding or reducing the stuff, and especially during the brushing of soft stocks, requiring high speed of roll, such as straw, papers, wood, &c., and the last stages of the treatment of the finished stuff, when, owing to its density or thickness, the roll has but a slight effect upon the stuff in turning it. Again, it acts to break up the various currents circulating in the engine, mixing and distributing them, (and especially when soft stocks, as papers, straw, wood pulp, &c., mixed with other heavier fiber, are under treatment,) so that the roll will act more equally and uniformly upon them and produce an evener pulp; lastly, relieving the engineer largely of his laborious duty of paddling the stuff, and, when the engine is being let down into the vats or stuff-chests, emptying the engine with rapidity.

The agitator S may be variously constructed with four or more arms or blades radiating from a center, or it may be of a spiral form.

By the action of the levers 1, 2, and 3 on the half-clutch, in engaging and disengaging it with its fellow half-clutch, loose on the shaft of the agitator, the working of the agitator S may be suspended at the will of the engineer. The relative diameters of the bevel-gears R U' regulate the speed of the agitator.

I am aware that propellers have already been used to facilitate the circulation of the stuff; but they have been usually placed at the surface, or but partially submerged.

The agitator above described is located at or near the bottom of the engine, where the tendency of the stock to settle and lodge is the greatest, and where the labor of the engineer in paddling the stuff is the greatest, and its use, as above explained, the more advantageous.

The washer T, of any suitable form of construction, is supported in a swinging frame, V. One end of this frame is secured in bearings W, Figs. 1 and 3, placed on the rim of the engine or other suitable support, while the inner end of the frame is free, and is tapered somewhat to fit into a socket to hold the frame V and its supported washer rigid and immovable during working.

The central power-distributing bevel-gear, R', drives the bevel-gear pinion U' on the washer-shaft and its secured washer, as will be seen. The speed of the washer T is mainly regulated by the respective diameters of the bevel-gears R' and U'.

It will be seen that when the swinging frame V is rotated it will describe in its rotation an arc of a circle, and remove the driven bevel-gear U from its driver R′, and the washer from the open space of the engine. The wash or dirty water passes from the washer T into the spout $f$, and thence by the pipe or conduit $c'$. The spout $c'$ is inclined at such an angle as will permit the washer T to pass it when the frame is rotated. The washer may be set at any proper depth of immersion for working.

X, Figs. 1 and 3, is a hollow column having at its top a small pulley, X′, over which latter passes a chain, rope, or wire rope. This chain is attached at one end to the inner end of the swinging frame, and, passing through the hollow column, is attached at the other end to the suspended weight Z, counterbalancing the swinging frame V and its supported washer T.

It will be seen that this manner of supporting and moving the washer permits it to be easily and rapidly thrown out of gear with its driver, assuming any angle required relative to the horizontal plane of the engine, and to be completely removed from the open space of the engine when renewals are needed to be made of its wire face, or access for repairs, &c., needed to the open space of engine.

In lieu of a column the sheaves may be secured to suitable supports over the engine, as the timbers or ceiling of a room.

The chain, by passing over proper directing-sheaves, may pass to an upper story, and thus leave the sides of the engine wholly free and accessible.

The pulley X may also have ridges in its grooves to receive the links of the chain, in order that the washer may be sustained at any required angle with the plane of the engine.

The circulo-rectangular form of engine already described largely facilitates the circulation of the stock when under treatment in the engine, and permits the advantageous and economical use of larger-sized engines than now, as will be seen, as well as an economical use of space and an easy accessibility on all sides.

The conformation of the central hollow vat, B, to the exterior inclosing-vat, A A, while aiding greatly the circulation of the stuff and acting as a mid-fellow, provides a convenient and safe receptacle for the machinery required to drive the washing and agitating apparatus and the roll-shaft, if required. Its height may be sufficient to prevent the stuff flowing over into its hollow space; or it may have a suitable cover.

The central distribution of the power driving the washing and agitating apparatus and the circular shape of a portion of the vat permit the use of as many washers and agitators as may be conveniently placed in it and used to advantage.

I have anticipated that the agitator S may be placed immediately beneath the washer T, so that its action in opening up and stirring the stock would permit the washer the more readily to remove the dirty water, &c.

I have also anticipated that the hand-wheel J may have a groove cut on it, so that a rope or chain may pass over it and over a grooved pulley suitably attached to the sides of the engine, or placed on the rim of the engine and at a convenient height, so that when motion by a hand-wheel is given to the grooved pulley the hand-wheel J will act as a nut, for the purposes already explained.

I have also anticipated that the bed-piece E, with its supported and attached bed-plate $e$, might also be variably moved, for the reasons already explained, by wedges or inclined planes $m$ $m'$, fitted into the bed-frame I, and acting upon the inclined sides of the lower side of the bed-piece E. The screw passing through the wedges $m$ $m'$ is incapable of moving lengthwise, and has cut on its ends right and left handed screw-threads.

When motion is given to the hand-wheel J, through the action of the screw $l$, the wedges will be caused to mutually advance or recede, with the effect on the bed-piece already explained, as shown in Figs. 4 and 5.

I have also anticipated that the bed-piece E may be variably moved or adjusted to the roll as required by a cylinder or roller eccentrically mounted and placed parallel with the bed-piece, and acting upon a suitably-curved surface of the under side of the bed-piece. On the axis of the eccentric roller is placed a worm-gear, which receives motion from a suitable screw and hand-wheel, producing in this manner the desired movement of the bed-piece E.

Fig. 6 represents a method of rigidly and firmly holding the swinging frame V by dogs $d$ $d$, attached to the inner end, $a$, of the frame. When this latter descends into the space beneath the cover or top of the vat B the dogs $d$ $d$ will engage and abut against this top and hold the frame rigid, as required.

The dogs $d$ $d$ may be disengaged by any suitable arrangement of levers.

The engine, as above described, may be supplied with the usual and necessary working accompaniments of the ordinary engine, such as cover-over roll, valves, water-cocks, sand-trap, &c., and placed in similar positions to those occupied in the ordinary engine.

The back and front falls, as well as the bed-frame, may also, for strength and solidity, be cast in one piece. (See Fig. 2.)

Having now explained the nature of my invention, what I claim, and desire to secure by Letters Patent, is—

1. The combination of the roll C, stationary in its bearings, with the movable bed-plate $e$, the latter secured to the rigidly-sliding bed-piece E, and capable of being moved or variably adjusted to said roll, as explained, by the action of the screws G G′ G², or their equivalents, on the bed-piece E, all arranged and operating substantially in the manner and for the purpose set forth.

2. The vat A A, of the contour or shape $s'$ $s^2$ $s^3$ $s^4$, in combination with the interior conforming-vat B, arranged and operating substantially in the manner and for the purpose set forth.

3. The combination of the spur-gears L M, miter-gears N N', and screw o with worm-gear P, all arranged and operating substantially in the manner and for the purpose described.

4. The combination of the bevel-gear R and pinion U with the submerged agitator S, all arranged and operating substantially in the manner and for the purpose set forth.

5. The submerged agitator S, arranged and operating substantially in the manner and for the purpose set forth.

6. The counterbalanced swinging frame V, carrying the washer T, arranged and operating substantially in the manner and for the purpose set forth.

7. The combination of the bevel-gear R' and pinion U' with the counterbalanced swinging frame V, all arranged and operating substantially in the manner and for the purpose set forth.

8. The placing of the submerged agitator S directly beneath the washer T, in order that the action of the agitator S in opening up the circulating stuff may assist the washer T in the removal of the dirty water, &c., as explained.

GEORGE H. ENNIS.

Witnesses:
GEO. F. PECK,
JESSIE D. ENNIS.